United States Patent Office 3,533,958
Patented Oct. 13, 1970

3,533,958
PROCESS FOR MAKING MINUTE CAPSULES
Isidore L. Yurkowitz, Dayton, Ohio, assignor to The National Cash Register Company, Dayton, Ohio, a corporation of Maryland
No Drawing. Filed July 22, 1966, Ser. No. 567,038
Int. Cl. A61k 9/04; B01j 13/02
U.S. Cl. 252—316
2 Claims

ABSTRACT OF THE DISCLOSURE

A process of manufacturing minute capsules en masse, said capsules having a predominance of single core entities comprising
(1) dispersing the core entity in a liquid medium having dispersed therein the wall-forming polymer and
(2) wrapping the core entities with wall-forming polymer by causing the emergence of a coacervate phase of the wall-forming polymer in a manner such that during the formation of the embryonic capsules there is not a substantial amount of free (unattached to core entities) coacervate in the system. The walls of the capsules are thereafter set to make them self-sustaining.

---

This invention concerns a process of manufacturing minute capsules en masse in a liquid manufacturing vehicle and the capsule product, wherein the capsule comprises a single core entity or a small number of core entities and a seamless self-sustaining wall surrounding the core material. By "minute capsules" or "microcapsules" are meant capsules from a few microns to several thousand microns and possibly somewhat larger in average size.

In the past, minute capsules or microcapsules have been made by a process which generally involves the deposition of a liquid wall-forming polymeric material about a core entity to form a so-called embryonic capsule and subsequent treatment of the embryonic capsule to harden the wall material. The embryonic capsules are formed by inducing the formation of a liquid wall-forming polymeric solution (coacervate) in the presence of core entities, both the polymeric solution and the core entities being dispersed in a liquid manufacturing vehicle. The wall-forming polymer solution is commonly referred to as a coacervate, and, when dispersed in its equilibrium liquid, it is commonly referred to as the coacervate phase of a system comprising three phases; namely, the core material, the wall-forming polymer solution, and the manufacturing vehicle, the first two being dispersed by agitational forces in the latter during the deposition or wrapping of the wall-forming polymer solution about the core entity.

Procedures for manufacturing minute capsules or microcapsules by the aforementioned process are described, for example, in U.S. Pats. Nos. 2,800,457, issued July 23, 1957, on the application of Barrett K. Green and Lowell Schleicher; 2,800,458, issued July 23, 1957, on the application of Barrett K. Green; and 3,041,289, issued June 26, 1962, on the application of Bernard Katchen and Robert E. Miller, all assigned to the assignee herein. With the procedures referred to above (deliberate and desired in the procedure of Pat. No. 3,041,289), and particularly in the case where the core entities are 100 microns or below, there is a tendency for clustering to occur; i.e., individual capsule units will comprise a considerable number of core entities. For some end-use applications of the capsular units, this clustering is technically and economically undesirable.

The present invention provides a process for manufacturing microcapsules, en masse, wherein the predominant capsule unit is one having a single core entity or a small number (generally not in excess of three) of core entities, and involves the critical step of conducting the deposition of the wall-forming polymeric solution about the core entity in a manner that avoids formation of substantial amounts of "free" coacervate. Otherwise stated, the deposition step is conducted in such a manner that the introduction of coacervate, be at emergence in situ or addition as such to the manufacturing vehicle, is so controlled that only that amount of coacervate is present during the formation of the embryonic capsule that will relatively rapidly affix to the core entities, thereby avoiding the presence of a substantial amount of "free" or unattached particles or blobs of coacervate in the system during or after deposition of the wall-forming polymer solution. Optimally, the rate of deposition should approximate the rate of introduction of the coacervate phase into the system.

The capsule-forming process of this invention is characterized by the following steps:

STEP A

Establishing a system of the following three phases, characterized first of all by being mutually insoluble and unreactive and further characterized, respectively, as being:
(1) A continuous liquid phase manufacturing vehicle that constitutes a major portion by volume of the three phases in total and which prior to the introduction of the coacervate-phase-inducing agent comprises a solution of polymer(s) capable of incremental separation as a coacervate solution of wall-forming polymeric material upon introduction of the coacervate-phase-forming-inducing agent;
(2) A discontinuous phase of minute, mobile entities of core material, either solid or liquid, dispersed in the vehicle and constituting a minor portion by volume; and
(3) A discontinuous phase of minute, mobile entities of wall-forming polymeric material dispersed in the vehicle and constituted by a coacervate solution of wall-forming polymer, the coacervate solution being capable of wetting the core material, and wherein the rate of introduction of entities of coacervate solution into the system is such that said coacervate entities substantially immediately wrap about the core entities and the formation in the vehicle of substantial amounts of coacervate entities unattached to core entities is avoided, yet being a system wherein a major portion of the polymer present in the manufacturing vehicle is ultimately deposited on the core entities.

Formation of the system in the above-described manner results without more in the deposit of the coacervate solution around individual entities of core material, without any substantial degree of aggregation or clustering of the core entities so wrapped.

STEP B

The mass of Step A is subjected to one of many known procedures for firmly setting the liquid walls of polymeric material; e.g., in the case of temperature gelable polymers, by cooling below the gelation temperature.

STEP C

The capsules resulting from Step B are then hardened.

As noted above, the addition of phase-inducing agent should be limited in rate, so that the formation of excess coacervate phase is avoided; i.e., eliminating coacervate solution that is unattached to core material and free to migrate within the system. While not completely understood, the observed phenomenon is that the presence of substantial amounts of excess coacervate, particularly during the initial period of deposition of coacervate about the core material, results in substantial aggregation or clustering of the core entities, whereas absence of excess coacervate results in a capsule-manufacturing system wherein the preponderant number of capsules have a single core entity.

The term "phase-inducing agent" as used herein means any material(s) or conditions(s) which, introduced into a system comprising the other components essential to the coacervate phase formation, will effect the formation of the coacervate phase.

The amount of wall-forming material may be varied by varying the amount of the wall material provided to the system, and the degree and type of agitation used, the variance permissible ordinarily being in accordance with the need for protection of the core material and the protective characteristics of the wall-forming material selected for use.

Depending on the nature of the core material and that of the wall material, the embryonic capsules are more or less durable. Various supplemental treatments of the capsules so formed may be employed to harden their walls and thereby impart to them the desired durability and the desired impermeability relative to the core material and the environment, among other properties. Various procedures for hardening the embryonic capsules are well known to those skilled in the art.

The nature of the core material is the primary guide to the selection of the polymeric wall-forming material and of its solvent, and also to the selection of the liquid vehicle if that is not to consist of or include as a solvent the same material that is used as the wall-forming polymer solvent. This is because the process conditions usually are chosen with the object of encapsulating some given core material. Hence the polymer and its solvent must be immiscible with the core material, but capable of wetting and depositing around entities of it.

Given these criteria of selection, the classes of materials that are useful in constituting the vehicle and the coacervate solution of wall-forming polymeric material useful in the subject invention are ascertainable from existing knowledge and means of selection of polymeric materials and solvents in respect to the following properties; viz:

(1) Solubility of polymeric material in various solvents;

(2) Ability of coacervate solution of wall-forming polymeric material to wet the given core material, liquid or solid;

(3) Ability to exist in a separate solution phase in the vehicle or manufacturing liquid phase.

Materials thus selected are useful in the encapsulation of any immiscible but wettable core material, liquid or solid.

CORE MATERIALS

Among the materials which may be core entities in the individual capsules are natural, mineral, animal, and vegetable oils, and fractions or mixtures thereof. Specific examples of mineral oils are petroleum and its fractions, such as lubricating oil, kerosene, gasoline, naphtha, and paraffin oil. Among the animal-derived oils may be mentioned sperm oil, cod-liver oil, other fish oils, melted butter-fat, lard oil, and neat's foot oil. Vegetable and fruit oils which are adapted for encapsulation include, among many, lemon oil, peanut (ground nut) oil, linseed oil, soy bean oil, castor oil, corn oil, and tung oil. Also considered as vegetable oils are some common water-immiscible liquids, such as turpentine and tall oil. Among synthetic liquids classed as oils may be mentioned methyl salicylate, benzene, toluol, vitamin-A-palmitate, chlorinated diphenyl, benzyl-benzoate, styrene monomer, melted hydrogenated oils, and other modified natural water-immiscible liquid materials.

Among the many pharmaceutical solids which are available for encapsulation are riboflavin, salicylamide, water-soluble tetracycline hydrochloride, tetracycline phosphate, phenaglycodol, chlorotrianisene, chloesterol, meprobamate, erythromycin propionate, benzathine penicillin G, and vitamin K.

Not expressly specified, but eminently subject to encapsulation, are many flavor, aroma, and perfume substances which are solids or are contained in solution in solids; or liquids, such as cocoa butter, coffee oil, peppermint oil, spearmint oil, musk, citronella-oil, and palm-oil.

The whole field of available substances that can be encapsulated by the method specified herein is so vast that the particular substances noted above as core materials possibilities may be considered merely as a variety of examples. The capsules made by the specified method of this invention may contain volatile or oxidizable core materials which are protected against such action by being enclosed in the capsule wall materials.

In general, a typical combination of components forming the system of this invention would include the use of a hydrophilic wall-forming polymeric material, an aqueous vehicle and a water-insoluble core material, or a hydrophobic wall-forming polymeric material, an organic solvent vehicle and a water-soluble core material.

The invention may be further illustrated by reference to the examples set forth herein; the invention being exemplified by reference to a water-insoluble core material, an aqueous solvent as the vehicle, and a tri-hydrophilic polymer complex, the coacervate solution of said tri-hydrophilic polymer complex forming the first deposit about the core material.

Example I

Procedure for making a single oil drop capsule:

This example concerns the encapsulation of an oil drop having a colorless dye dissolved therein, the capsule wall being formed of a gelatin/gum arabic/polyvinyl methyl ether-maleic anhydride (PVM/MA) copolymer material. Preparation of the system was as follows:

(I) Gelatin solution.—110 grams of high-quality acid-extracted pigskin gelatin (Bloom strength—285 to 305 grams, isoelectric point—pH 8 to 9) was dissolved in 890 grams of distilled water at a temperature of 55 degrees centigrade. The pH of this solution was raised to 6.3–6.7 by use of 20 percent, by weight, sodium hydroxide in distilled water.

(II) Gum arabic solution.—110 grams of high-quality gum arabic was dissolved in 890 grams of distilled water.

(III) Dye-oil solution.—22.5 grams of crystal violet lactone and 18.75 grams of benzoyl leuco methylene blue were dissolved in 972.5 grams of chlorinated biphenyl (biphenyl having 42 percent, by weight, substituted chlorine) and 486.25 grams of refined, essentially paraffin-like, oil (sold as "Dispersol-81515" by Shell Oil Company, New York, N.Y., United States of America), having an initial boiling point of 370 to 400 degrees Fahrenheit and a final boiling point of 450 to 500 degrees Fahrenheit. The system was heated to 90 degrees centigrade to accomplish solution of the dyes.

(IV) Polyvinylmethylether-maleic anhydride (PVM/MA) copolymer solution.—Twenty-three grams of the PVM/MA (such as "Gantrez AN" sold by General Aniline and Film Corporation, New York, N.Y., United States of America, which has a specific viscosity of 1.0 to 1.4 in 1 percent, by weight, ethylmethylketone solution at 25 degrees centigrade, a softening point of 200 to 225 degrees centigrade, and a specific gravity of 1.37) was dissolved in 460 grams of distilled water by being stirred at a temperature of 90 degrees centigrade until the liquid was clear.

(V) Sodium salt of PVM/MA.—To the solution of IV was added 47 grams of 20 percent, by weight, aqueous sodium hydroxide solution.

(VI) Gelatin-oil emulsion.—In a five-quart Waring Blendor, 925 grams of solution I and 507 grams of distilled water having a temperature of 55 degrees centigrade were blended, at low speed, with 1425 grams of solution III. The addition of III required about twenty seconds. Blending was continued for two to three minutes until an average emulsion droplet diameter of three to five microns was obtained.

Coacervation step.—To 417 grams of the above emulsion were added 136 grams of solution II and 447 grams of distilled water in a 1500-milliliter beaker. All components were kept at 55 degrees centigrade, and the beaker was placed in a 57-degree-centigrade constant temperature bath. The pH of the liquid system was adjusted to 9.0 with 20 percent, by weight, aqueous sodium hydroxide solution while being agitated.

Phase separation was induced by adding, at a constant rate over ten to fifteen minutes, 13.5 milliliters of a mixture composed of 9 milliliters of solution IV and 4.5 milliliters of 14.7 percent, by weight, aqueous solution of acetic acid. The phase separation step was completed by addition of 3 milliliters more of 14.7 percent, by weight, aqueous acetic acid and subsequent chilling in an ice bath to below 12 degrees centigrade. While the system was at a temperature below 12 degrees centigrade, 7.5 milliliters of 25 percent, by weight, aqueous glutaraldehyde (pentanedial) was added. The system was allowed to stir for twelve hours while gradually warming to about 25 degrees centigrade, and then 24 milliliters of solution V was added drop by drop. The system was stirred for an additional hour, and the pH was raised to 9.8–10.2 by use of 20 percent, by weight, aqueous sodium hydroxide solution.

The capsule product had a particle-size range with a peak at 3.25 microns or less. Inspection of the capsules showed a predominance of single-core entities.

It has also been found that capsules having a predominance of single-core entities may be produced in a system wherein the solids content of the wall-forming polymer may be substantially increased to thereby substantially increase the production of capsules per unit volume of total system. Example II illustrates the preparation of single-core entities at a "high" solids concentration; i.e., 2.4 percent gelatin as compared to 1.9 percent gelatin of Example I.

Example II

All solutions and emulsions for this example were prepared as in Example I.

Coacervation step.—The following materials were weighed into a 1500-milliliter beaker:

417 grams emulsion solution VI, 55 degrees centigrade
91 grams 11 percent gum arabic solution III, 55 degrees centigrade
327 grams water, 55 degrees centigrade.

The mixture was placed in a water bath (57 degrees centigrade) and stirred with a laboratory mixer, and the pH was adjusted to 9.0 with 20 percent, by weight, sodium hydroxide solution.

The phase separation and the final capsule preparation were conducted identically with Example I.

The single-core-entity microcapsules are desirable for use in the so-called "carbonless carbon paper" on a transfer sheet. Generally, for use in such sheets, the capsule size should not exceed twelve to fourteen microns. When the capsule is an aggregate of core entities, as compared to a single core entity, the transfer efficiency is lessened.

The "high" solids feature is also applicable to the preparation of capsules having a plurality of core entities, commonly referred to as an "aggregate system."

What is claimed is:

1. The process of forming minute capsules en masse wherein the predominant portion of the capsules have a single core entity, which comprises:
   (a) establishing an agitated system consisting of an aqueous liquid solution of hydrophilic wall-forming polymeric material which forms a continuous first phase; dispersing therein a second phase consisting of minute mobile entities of core material substantially insoluble in said continuous first phase;
   (b) adding to the system of (a), once established, an acidified aqueous solution of coacervation-inducing polymeric material at a rate to cause emergence of a coacervate solution of the wall-forming polymeric material and its deposit upon said core entities at substantially the same rate as it emerges from solution, thereby forming embryonic capsule walls and avoiding, at any one time, an accumulation of undeposited coacervate in the system; and
   (c) setting the walls of the capsules of step (b) to make them self-sustaining.

2. The process of forming minute capsules en masse wherein the predominant portion of the capsules have a single core entity, which comprises:
   (a) establishing an agitated aqueous solution of gelatin and gum arabic as a continuous liquid phase;
   (b) dispersing in the continuous liquid phase of step (a) minute, mobile entities of core material; said entities being substantially insoluble in the continuous liquid phase;
   (c) adding to the continuous liquid phase an aqueous solution of acetic acid having dissolved therein a copolymer of methyl vinyl ether/maleic anhydride in such manner as to effect the formation and emergence of a coacervate of the polymer materials and deposition of said coacervate about the core entities without the build-up in the system of substantial amounts of coacervate solution unattached to the core entities; and
   (d) setting the capsules so formed by chilling.

References Cited

UNITED STATES PATENTS 2,980,941  4/1961  Miller _____ 252—316 X

RICHARD D. LOVERING, Primary Examiner

U.S. Cl. X.R.

99—166; 117—36.2, 36.7, 100; 424—32, 33, 34, 37

UNITED STATES PATENT OFFICE
CERTIFICATE OF CORRECTION

Patent No. 3,533,958　　　　　　　　　　　　　　　October 13, 1970

Isidore L. Yurkowitz

It is certified that error appears in the above identified patent and that said Letters Patent are hereby corrected as shown below:

Column 5, line 31, after "microns" insert -- , 83.8 percent of the particles having diameters of 5.17 microns --.

Signed and sealed this 6th day of April 1971.

(SEAL)
Attest:

EDWARD M. FLETCHER, JR.　　　　　　　　　WILLIAM E. SCHUYLER, JR.
Attesting Officer　　　　　　　　　　　　Commissioner of Patents